(12) United States Patent
Sakai

(10) Patent No.: US 6,250,658 B1
(45) Date of Patent: Jun. 26, 2001

(54) VEHICLE SUSPENSION SYSTEM

(75) Inventor: Koji Sakai, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/377,448

(22) Filed: Aug. 19, 1999

(30) Foreign Application Priority Data

Aug. 20, 1998 (JP) .................................................. 10-234785

(51) Int. Cl.$^7$ .................................................. B60G 21/073
(52) U.S. Cl. .......................... 280/124.106; 280/124.159; 280/124.16; 280/124.162; 267/64.17
(58) Field of Search .................. 280/5.506, 5.507, 280/5.508, 124.106, 124.157, 124.158, 124.159, 124.16, 124.161, 124.162; 267/64.17, 64.11, 64.25

(56) References Cited

U.S. PATENT DOCUMENTS

| | | | |
|---|---|---|---|
| 3,024,037 | * 3/1962 | Fiala | 280/124.158 |
| 3,032,349 | * 5/1962 | Fiala | 280/124.158 |
| 3,112,923 | * 12/1963 | Ley | 280/124.158 |
| 3,399,905 | * 9/1968 | Vogel | 280/124.157 |
| 3,563,566 | * 2/1971 | Weber | 280/124.162 |
| 4,277,076 | * 7/1981 | Hanna | 280/124.159 |
| 4,411,447 | * 10/1983 | Hart | 280/124.159 |
| 4,606,551 | * 8/1986 | Toti et al. | 280/124.106 |
| 4,798,398 | * 1/1989 | Cummins | 280/124.159 |
| 5,020,826 | * 6/1991 | Stecklein et al. | 280/124.159 |
| 5,040,823 | * 8/1991 | Lund | 280/5.506 |
| 5,344,124 | * 9/1994 | Runkel | 267/64.25 |
| 5,486,018 | 1/1996 | Sakai . | |
| 5,547,211 | * 8/1996 | Runkel | 280/124.159 |
| 5,785,344 | * 7/1998 | Vandewal et al. | 280/124.106 |
| 6,010,139 | * 1/2000 | Heyring et al. | 280/124.106 |
| 6,042,366 | * 2/2000 | Masamura | 280/124.162 |
| 6,102,418 | * 8/2000 | Runkel | 280/124.106 |

FOREIGN PATENT DOCUMENTS

02136319 * 5/1990 (JP) .
08132846 * 5/1996 (JP) .
10067217 * 3/1998 (JP) .

* cited by examiner

Primary Examiner—Lanna Mai
Assistant Examiner—Ruth Ilan
(74) Attorney, Agent, or Firm—Ernest A. Beutler

(57) ABSTRACT

A number of embodiments of suspension systems for vehicles having at least two wheels, each of which is independently suspended by a system including a respective shock absorber. The shock absorbers may be generally conventional in nature but are interconnected by a system that includes an accumulator and a flow control so as to provide a damping for vehicle characteristics that is independent of the individual damping of each wheel's shock absorber. The systems also provide constructions so that both the vehicle and individual wheel damping can be independently controlled to permit the use of smaller shock absorbers.

29 Claims, 6 Drawing Sheets

VEHICLE SUSPENSION SYSTEM

BACKGROUND OF THE INVENTION

This invention relates to a vehicle suspension system and more particularly to a damping system for controlling the motion of a pair of independently suspended vehicle wheels so as to provide interrelationship between their action for controlling vehicle movement.

Vehicle suspension systems have been proposed that embody individual hydraulic dampers associated with each of the wheels for damping their respective motion. As a further improvement upon this arrangement, systems have been proposed wherein pairs or more of wheels may be interrelated so as to control roll and/or pitch of the vehicle in addition to the individual wheel damping when encountering road objects. Various systems have been purposed for accomplishing this effect, many of which become quite complicated in nature and in construction.

There has been proposed, however, an interrelating system between pairs of wheels suspensions wherein the interrelationship is accomplished in a simplified manner and yet which provide good control not only of the individual wheel movements when encountering individual obstacles but also for controlling vehicle movement during such things as cornering, breaking or acceleration wherein pitching may occur.

One particularly advantageous type of system and numerous embodiments of it is disclosed in U.S. Pat. No. 5,486,018 issued Jan. 23, 1996. In the systems shown in this patent, each wheel is associated with a hydraulic damper that is comprised of a cylinder in which a piston reciprocates. The cylinder is connected to either the wheel or vehicle body and the piston is connected by a piston rod to the remaining vehicle component. The piston divides the cylinder into a pair of fluid chambers one of which may be considered to be a working chamber and the other of which may be considered to be a reservoir chamber. A damping valving arrangement is provided for controlling the flow between the working cylinder portion and the reservoir chamber. Thus, the individual units act like conventional shock absorbers.

However, the piston rod displaces a volume in one of the chambers and thus, it is necessary to provide a reservoir where makeup fluid may be added and subtracted to compensate for this piston rod displacement. In accordance with the embodiments disclosed in that patent, pairs of wheels have a common reservoir arrangement which acts as a pressure control system. The makeup fluid from each unit is transmitted to a respective variable volume chamber and the moveable elements of those two chambers are interlinked to each other so as to provide additional suspension control between the two associated wheels for controlling vehicle body movement. This can be utilized to reduce roll and/or pitching.

For example, if the associated or interconnected wheels are at opposite sides of the vehicle, when both wheels strike an obstacle, each piston and cylinder of the shock absorbing unit will undergo the same movement in the same direction. The differential fluids are transferred between the pressure control device and will cause equal displacements of the moveable members that are interlinked and the system operates as a conventional suspension system.

If, however, the vehicle rounds a curve, one suspension unit, on the outside, will tend to be compressed while that on the inside will tend to expand. Thus, there is a differential flow of fluid between the units and the interconnection provides further damping control resisting such body motion.

The difficulty with this type of system is that the requirements in terms of size and capacity of the individual shock absorbers is a different value for optimum damping when equal displacements take place during normal straight ahead movement than when rounding a curve. Similar situations are true with respect to front and rear interconnected suspensions for damping pitching movements during acceleration or braking.

That is, when the pressure control device is acting to dampen body movements between the two wheels, the pressure control device works in combination with the respective shock absorbers. Because of this, the individual wheel shock absorbers should be made somewhat smaller to reduce their effect on the overall body control. Thus, the individual shock absorber design tends to be a compromise between the optimum for these two different damping conditions.

It is, therefore, a principal object of this invention to provide an improved suspension system for interrelated wheels of a vehicle that provides optimum damping under all types of conditions.

It is a further object of this invention to provide an improved vehicle suspension system for a vehicle wherein the damping arrangement is optimized for each type of condition utilized in a simple but effective manner.

SUMMARY OF THE INVENTION

This invention is adapted to be embodied in a suspension system for a vehicle having at least two wheels each of which is supported for suspension movement by a vehicle body. A first damping element having a pair of relatively moveable members defining a first fluid chamber is interposed between one of the wheels and the vehicle body for varying the volume in the first fluid chamber upon suspension movement of the one wheel. A first damping means dampens the flow of fluid from the first fluid chamber. In a like manner, a second damping element having a pair of relatively moveable members defining a second fluid chamber is interposed between another of the wheels and the vehicle body for varying the body of the second fluid chamber upon suspension movement of the other wheel. Second damping means dampens the flow of fluid from the second fluid chamber. A conduit interconnects the first and second fluid chambers and control means as provided in this conduit for precluding the flow through the conduit in response to a first suspension condition and for providing a damped flow therebetween in response to a second suspension condition. An adjustable control is provided for adjusting the relative effect of the interrelationship between the pressure control and the individual dampers.

DETAILED DESCRIPTION OF THE PREFERRED EMBODIMENTS OF THE INVENTION

Figure 1:
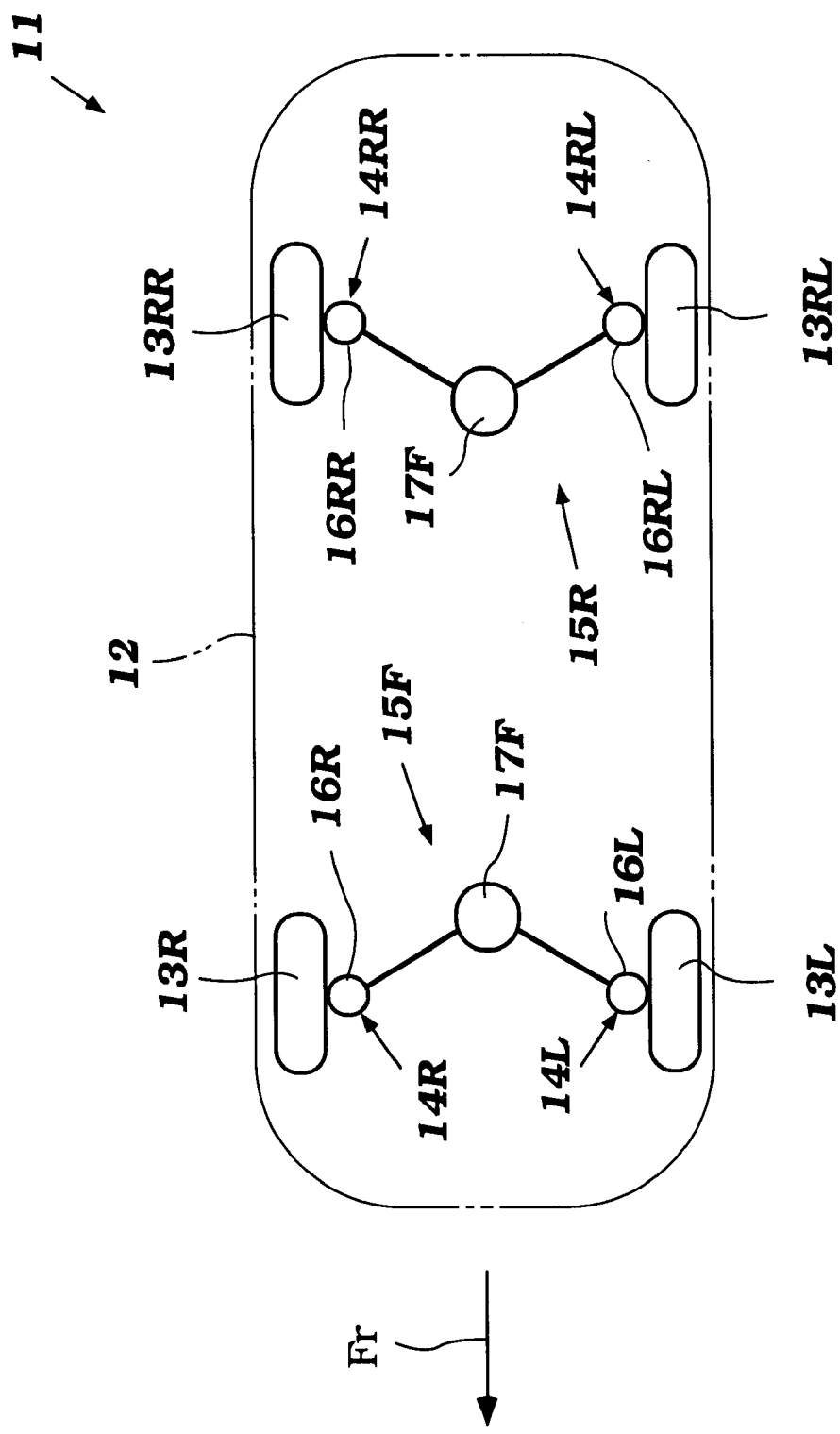
FIG. 1 is a partially schematic top plan view of a four wheel vehicle having a suspension system constructed in accordance with an embodiment of the invention.

Referring now in detail to the drawings and initially to FIG. 1, a vehicle of a type which can be utilized to advantageously employ the suspension systems in accordance with this invention is shown partially schematically and identified generally by the reference numeral 11. In the illustrated embodiment, the vehicle is of the four wheel type and may be an automobile, by way of example.

The automobile 11 is comprised of a body assembly 12 that is designed to normally travel in a forward direction indicated by the arrow FR. There are, therefore, a pair of front wheels 13L and 13R at each side of the vehicle which are suspended from the vehicle body 12 by means of respective suspension systems, indicated generally by the reference numerals 14L and 14R, respectively. These suspension systems 14L and 14R form components of an interrelated front suspension system indicated generally by the reference numeral 15F. This front suspension system 15F includes a pair of hydraulic dampers 16L and 16R each associated with a respective one of the wheels 13L and 13R, in a manner which will be described in more detail later by reference to FIG. 2.

The front suspension system 15F also includes an interrelated control assembly, indicated generally by the reference numeral 17F and which also has a construction as will be described later generally by reference to FIG. 2 and in more detail subsequently by reference to FIGS. 3 and 4.

A pair of rear wheels 13RL and 13RR are suspended by a suspension system, indicated generally by the reference numeral 15R. Like the front suspension system 15F, the rear suspension system 15R includes a pair of rear suspension unit 14RL and 14RR that include individual dampers 16RL and 16RR. These damper units are interconnected by a control 17R. Again, the relationship is the same as that shown in FIG. 2 and will become more apparent shortly.

It should be understood that the inventions deals herewith the interrelationship between two wheels of a vehicle and in the illustrated embodiment the interrelated wheels are front and rear wheel pairs. This type of suspension system is particularly useful in damping and controlling vehicle roll as encountered when maneuvering such as cornering in addition to the normal, individual wheel damping. It should be readily apparent to those skilled in the art, that the invention can also be utilized in an arrangement wherein the front and rear wheels at each side of the vehicle are paired and interconnected so as to control pitching as may occur when accelerating or decelerating.

Figure 5:
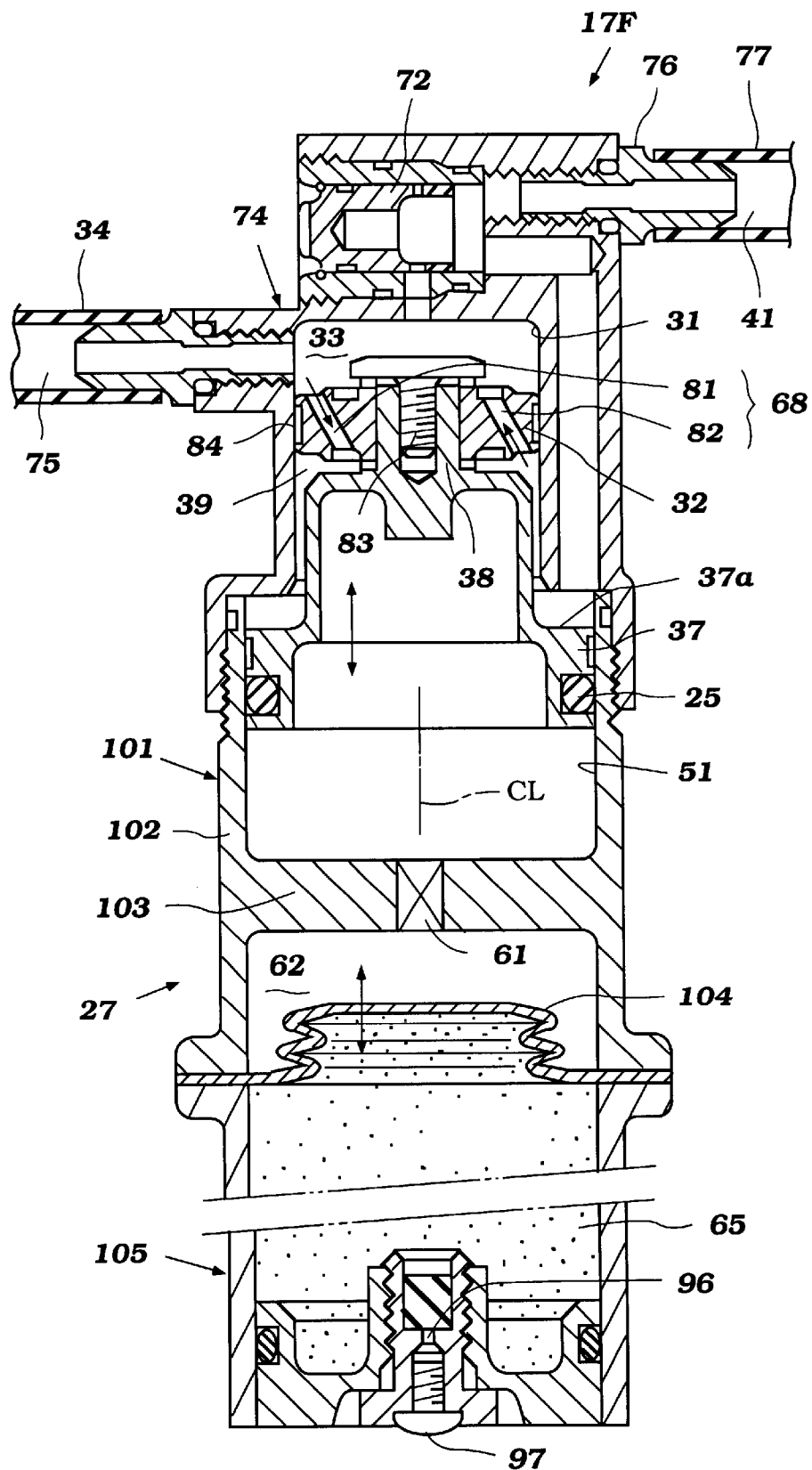
FIG. 5 is a cross-sectional view, in part similar to FIGS. 3 and 4 and shows another embodiment of the invention.
Figure 6:
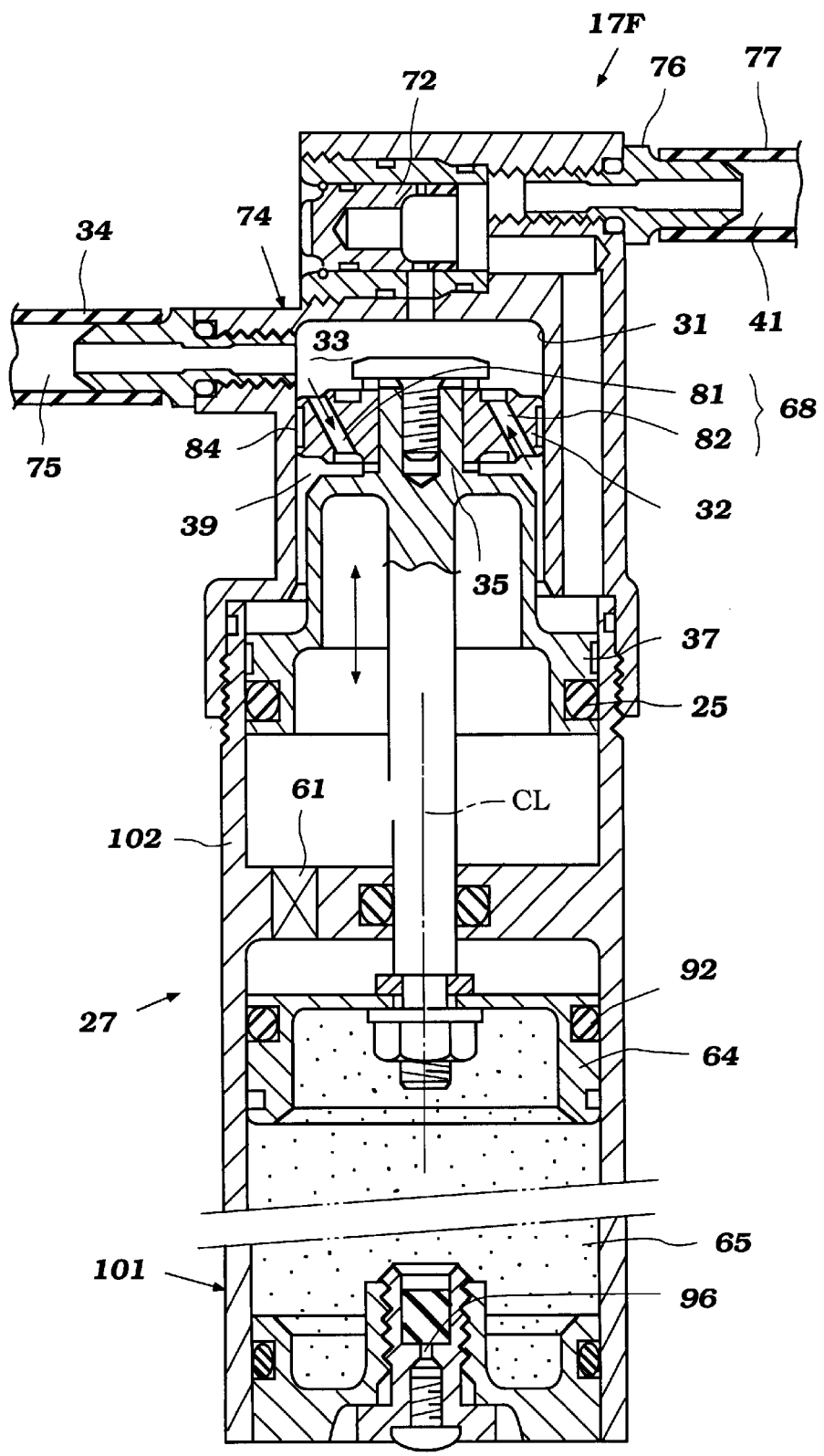
FIG. 6 is a cross-sectional view, in part similar to FIGS. 3, 4 and 5 and shows a third embodiment of the invention.

The physical structure of the suspension systems 15F and 15R will now be described primarily through reference to FIG. 2 wherein the components of the various units will be identified, where they are the same structurally, by the same reference numerals with the identifying subscript added to indicate whether it deals with the left or right side. FIG. 2 shows the control unit 17F in a generally schematic manner. An embodiment of the actual physical construction is shown in FIGS. 3 and 4. Other embodiments are shown in FIGS. 5 and 6.

As previously noted, the front and rear suspension systems 15F and 15R are basically the same, except that their specific calibration may be different depending upon the vehicle.

Each suspension unit damper 16 is comprised of a cylinder assembly 18 that has a trunion portion 19 formed integrally therewith for attachment to either the vehicle body 12 or the wheel suspension for the wheel 13. In the illustrated embodiment, a connection to the body 12 is depicted.

The cylinder 18 defines a cylinder bore in which a piston, indicated generally by the reference numeral 21 is positioned. The piston 21 divides the interior chamber of the cylinder 18 into an upper or working chamber 22 and a lower or reservoir chamber 23. These chambers are sealed from each other suitably via seals carried by the piston 21, except as will hereinafter be noted.

A piston rod 24 extends through the reservoir chamber 23 and is connected to the suspension system for the front wheel 13 which may be of any known type. In addition, a coil compression spring 25 may cooperate with the suspension system. As previously noted, this arrangement can be reversed that is the cylinder 19 can be connected to the wheel 13 and the piston rod 24 can be connected to the vehicle body 12.

A damping valve arrangement 26 is provided in the piston 21 so as to control the flow from the chamber 22 to the chamber 23 and also to permit return flow.

The pressure control 17 includes a pair of control cylinders, indicated generally by the reference numerals 27 and 28 which, in the illustrated embodiment, are formed in a common housing assembly 29. This housing assembly 29 has a first smaller diameter portion 31 in which a piston 32 is received. The piston 32 has a head surface 32a defines a fluid pressure chamber 33. This chamber 33 communicates with the pressure chamber 22L of the damper 16L through a main communication line 34.

The functions of the reservoir chamber 23L and the pressure chamber 22L can be reversed, if desired. In such a case the reservoir chamber 23L now acting as the pressure will communicate with the chamber 33 through a pressure line 35, shown in phantom in FIG. 2. In this case the line 34 is eliminated.

The pressure control housing assembly 29 includes a larger diameter cylinder 36 in which a piston 37 is received. The piston 37 is connected to the piston 32 for simultaneous movement therewith by an interconnecting member 38. Thus the pistons 32 and 37 move together.

Since the cylinder bores 31 and 36 are basically connected to each other between the pistons 32 and 37, the effective area of a fluid chamber 39 acting on the head area 37a of the piston 37 is equal to the cross-sectional area of the piston head 37a minus the cross-sectional area of the piston head 32a. The diameter of the piston head 37a is chosen so as to provide such an equal effective areas for each unit.

The chamber 22R of the suspension unit 16R communicates with the chamber 39 through a main communication passageway 41. In a similar manner to the unit 16L, if the functions of the chambers 22R and 23R are reversed, the reservoir chamber 23R of the unit 16R now acting as a pressure chamber communicates with this chamber 39 through a passage 42, again shown in phantom in FIG. 2. Again in this event, the line 41 is eliminated.

Although the piston valves 26 of the main suspension units 16 provide the damping control, there also can be provided control valves, indicated generally by the reference numerals 43 and 44 in the lines 34 and 41 connecting the shock absorber working chambers 22L and 22R with the pressure control chambers 33 and 39. Each valve 43 includes a flow control orifice 45 which may be of a fixed or adjustable diameter and which controls and further restricts the flow from the respective unit 16 into their respective chambers 33 and 39.

Oppositely acting check valves 46 permit flow from the chambers 39 and 33 back to the working chambers 22R and 22L without restriction. Hence, these devices 43 and 44 provide additional damping only in the actuating or pressure increasing mode.

As already noted that the actual physical construction of the control 17F will be described in more detail shortly by particular reference to FIG. 3. FIG. 2 illustrates only a schematic illustration of the control 17F while FIG. 3 shows an actual physical construction that may be utilized in conjunction with it.

Before getting into the detailed physical construction of the control unit 17F, an operation of the structure as thus far described will be made. First, assuming the vehicle 12 is traveling down the road and both front wheels 13L and 13R encounter the same obstacle, the wheels will be raised as shown by the solid line arrows in this figure.

At this time, the fluid in the chambers 22L and 22R will be compressed and forced through the control valves 26 into the respective reservoir chambers 23L and 23R. However, the amount of fluid displaced from the chambers 22L and 22R is greater than can be accommodated in the chambers 23R of the units 16L and 16R, because of the position of the piston rods 24 therein. Thus, the excess fluid will flow through the lines 34 and 41 to the chambers 33 and 39, respectively of the control 17F.

Some additional damping will occur through the orifices 45 of the control units 43 and 44. Since equal amounts of fluid are displaced, the downward movement of the interlocked pistons 32 and 37 will be the same and no fluid will be displaced between them. Thus, the shock absorbers or suspension units 16L and 16R operate basically as conventional shock absorbers. As will be discussed later, there are conditions when the travel of the individual wheels 13 relative to the vehicle body 12 are not the same. That condition will be described shortly.

This conventional shock absorbing action is also augmented by a further pressure control device, indicated generally by the reference numeral 49, which operates so as to control the pressure in a chamber 51 disposed beneath the piston 37 and which acts to move in response to the joint movement of the pistons 32 and 37 so as to further control the change in their positions.

As has been noted, when the front wheels 13L and 13R encounter the same size and shape obstacle, the pistons 32 and 37 will be driven downwardly in their respective cylinder bores 33 and 39. The chamber 51 has a cross-sectional area that is equal to the sum of the effective areas of the pistons 32 and 37 and hence, the fluid in the chamber 51 will be compressed upon this downward movement.

The fluid compressed in the chamber 51 is transferred through a conduit 52 to communicate with a chamber 53 formed in the pressure control device 49 and specifically within an outer housing assembly 54 thereof. The chamber 53 is formed by a cylinder bore 55 of the housing assembly 54 and a piston 56 that is fixed to an extending post 57 of an end closure 58 at one end of the housing 54. Fluid that is displaced from the chamber 51 will enter the chamber 53 or will flow in the opposite direction depending upon the direction of movement of the pistons 32 and 37.

An absorber valve, indicated generally by the reference numeral 61, is provided in the piston 56 and communicates the chamber 53 with a further closed chamber 62 also formed by the cylinder bore 55 and separated from the chamber 53 by the piston 56. The absorber valve, as will become apparent from the later description of FIG. 4, acts to dampen the flow in either direction past the piston 56.

In addition to the absorber valve 61, an adjustable orifice 63 is provided in a bypass line that extends between the chambers 53 and 62 for further adjustment of the conventional shock absorbing function of the system.

The chamber 62 functions as a closed accumulator chamber for fluid displaced as a result of the areas of the piston rods 24 and is maintained under a predetermined pressure by means of a floating piston 64 that is slidably supported in the lower end of the bore 55. This defines a further regulating or accumulator chamber 65 that may be either filled under pressure with an inert gas 66 and/or contain a spring 67 in order to provide a bias on the piston 64 and maintain a tight fluid arrangement in the hydraulic system as thus far described.

Thus, by virtue of this arrangement, there is a further pressure damping arrangement that will permit the cylinders or unit 16L and 16R to be designed so as to provide the desired degree of damping when each wheel receives approximately the same load and yet to provide a different damping effect when the loads are unequal as in cornering in a side-to-side relationship or pitching in connection with a front-to-rear relationship which condition will be described shortly.

The body control operation will now be described assuming now the condition when the vehicle 12 is cornering and considering the situation if the vehicle is executing a right hand turn. When this occurs, there will be a weight transfer toward the left hand side of the vehicle 12 so as to force the cylinder 18L of the damper unit 16L downwardly and compress the fluid in the working chamber 22L. At the same time, the opposite side of the vehicle will tend to lift and thus the cylinder 18R of the damper unit 16R will tend to move upwardly to cause the volume of the chamber 22R to increase. This condition is shown by the phantom line arrows in FIG. 2.

When this occurs, fluid will be displaced from the chamber 22L into the control chamber 33. At the same time, fluid will be drawn out of the chamber 39 to make up for the volume of the piston rod 24R due to the extending operation of the unit 16R. Thus, there will be a pressure differential between the chambers 33 and 39.

To provide damping for roll control, there is provided an absorber valve assembly, indicated generally by the reference numeral 68 in the piston 32 so as to permit controlled flow in both directions between the chambers 33 and 39 and damping thereof This is like the construction in the prior art and will assist in reducing or controlling body roll.

Figure 2:
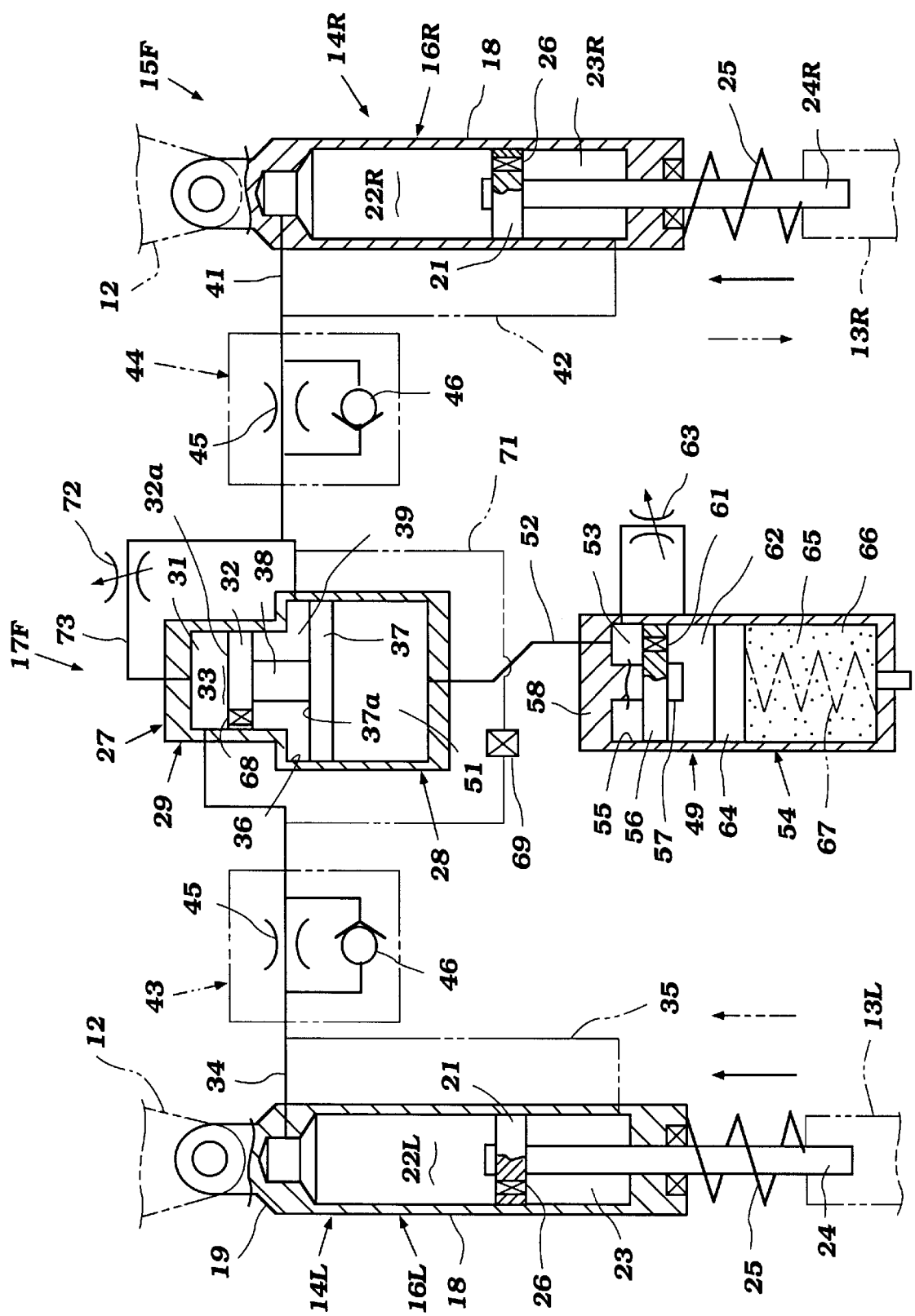
FIG. 2 is a partially schematic cross-sectional view taken through the suspension systems of a pair of the interrelated wheels.
Figure 3:
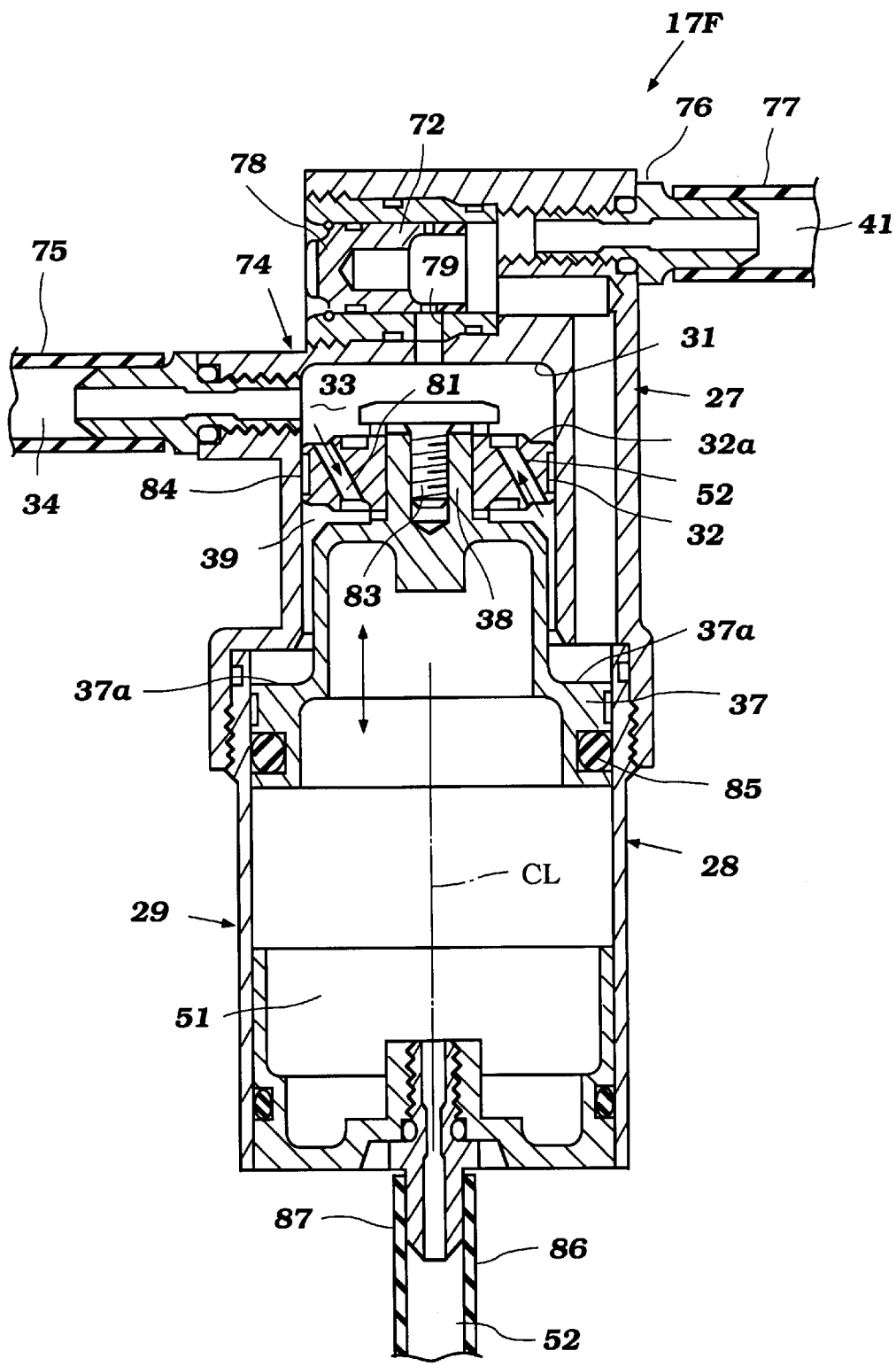
FIG. 3 is an enlarged cross-sectional view in non-schematic form showing the control arrangement.

Alternatively, to putting the absorber valve 68 directly in the piston 32, it may be located externally as seen at 69 in FIG. 2 wherein it controls the flow through an external bypass passage 71 between the chambers 33 and 39.

In accordance with another feature of the invention, the roll control may be further augmented by an adjustable valve or orifice 72 that is placed in a line that may be either within or external to the pressure control 28 and which is indicated schematically at 73. This valve 72 may be operated so as to provide adjustable control during vehicle travel in response to various sense conditions such as steering input or the like.

Thus, it should be apparent that because of the fact that the pressure control on the control 17F is independently controlled, the shock absorbers or units 16 may be designed so as to provide the desired degree of damping for roll control and the normal conventional shock absorbing function is also controlled by the operation of the control 17F in combination with the further flow control 49.

The actual physical structure of the elements of this embodiment will now be described by particular reference to FIGS. 3 and 4 which show the flow controls 27 and 49, respectively. Referring first to FIG. 3 which shows the flow control 27 in detail, the housing assembly 29 includes this first member to which a housing that forms the control 17F is connected by a threaded connection. The housing member of the control 27 is provided with an inlet nipple portion 74 that receives the hose 75 which forms the inlet conduit 34. In a like manner, a further nipple 76 of this housing member receives a hose 77 that forms the conduit 41 that connects with the right hand suspension unit 16R.

The adjustable flow control 72 is shown in full detail in this figure and includes a rotatable valve element 78 which controls the size of an orifice 79 extending between the chambers 33 and 39.

The absorber valve 68 is shown in most detail in this figure and includes a first set of valved passages 81 that extend from the chamber 33 to the chamber 39 and which permit flow only in this direction. A second series of valve passages 82 extend between the chambers 39 and 33, and thus, control the flow in this direction. The piston 32 is connected to the piston portion 37 by a threaded fastener 83. The piston 32 includes an annular seal 84 for sealing the chambers 33 and 39 from each other. In a like manner, the piston 37 carries an O-ring seal 85 that sealingly engages the bore 39 of the chamber 39.

Figure 4:
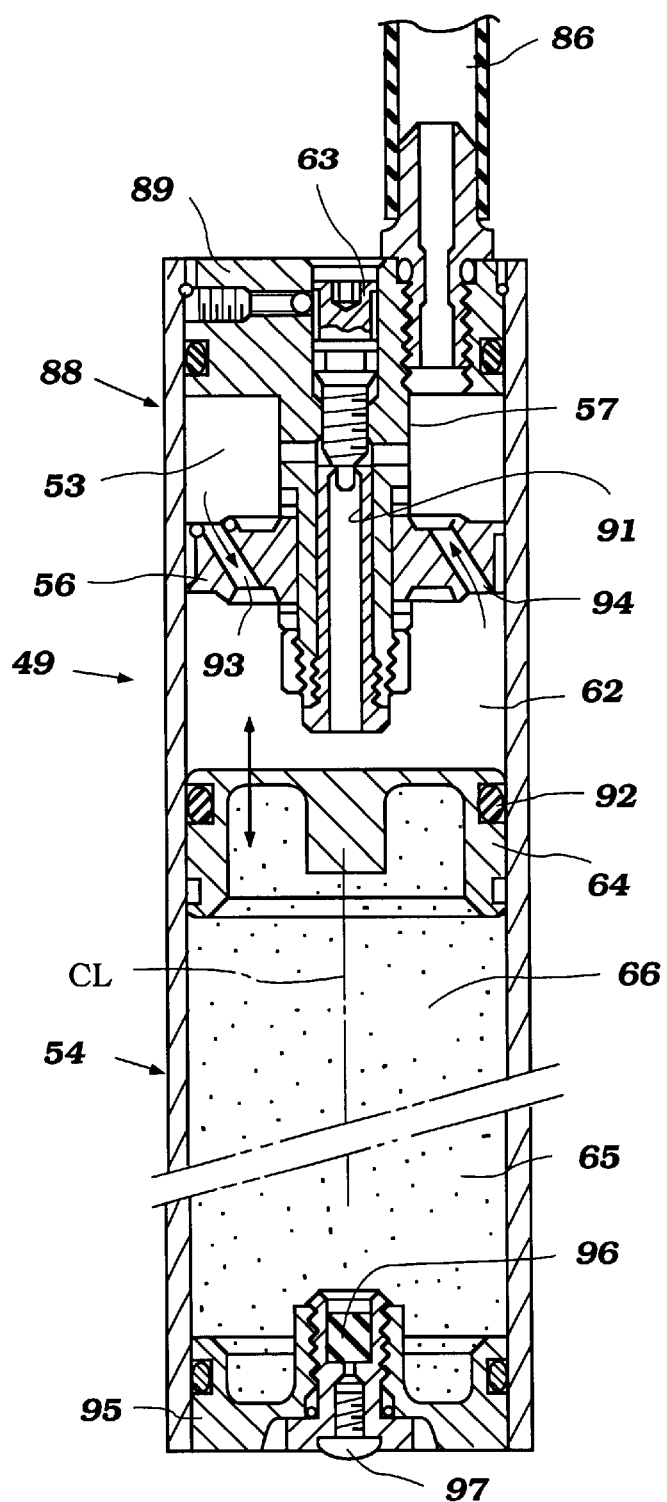
FIG. 4 is a an enlarged cross-sectional view in non-schematic form showing the adjustable control element for the interrelated control.

Finally, the interconnecting passageway 52 is formed by a hose 86 that is received on a nipple 87 formed on the lower portion of the housing piece of the unit 28 and communicates with the further flow control 54, which is shown in detail in FIG. 4.

The housing of the flow control 54 is a tubular member 88 that is closed by a first end closure 89 in which the adjustable valve 63 is provided. This valve controls the flow through a passage 91 formed by the post 71 and which communicates the chamber 53 with the chamber 62.

The floating piston 64 has an external groove in which a seal 92 is received so as to seal the accumulator chamber 65.

The shock absorbing valve 61 are mounted in the fixed piston 56 and comprise a first series of check valved passages 93 that communicate the chamber 53 with the chamber 62. A second series of valved passages 94 communicate the chamber 62 with the chamber 53.

The lower end of the housing member 88 is closed by a further end closure 95 that carries an elastic seal 96 closed by a fixed plug 97. A hypodermic type device may be inserted through the seal 96 so as to charge the chamber 65 with the inert gas 66.

In the embodiment as thus far described, the two pressure controls 27 and 49 have been formed by separate housing assemblies. FIGS. 5 and 6 show two additional embodiments wherein these units are combined into a single housing assembly.

Referring first to FIG. 5, this embodiment has the same basic construction as previously described, however, the tubular member 88 of the previous construction is eliminated as is the floating piston 66.

In this embodiment, a lower housing piece, indicated generally by the reference numeral 101, has an upper portion 102 which forms in essence the chamber 51. The absorber valve assembly 61 of the previous embodiment is positioned in an integral wall 103 formed below the chamber 51 and which communicates with the upper side of a flexible diaphragm 104 which takes the place of the floating piston 66 of the previously described embodiments so as to define the accumulator chamber 65 which is charged in the same manner as previously described. A further small housing piece 105 is affixed to the lower end of the housing piece 101 so as to define the chamber 62 above the diaphragm 104 and below the valve 61.

FIG. 6 shows yet another embodiment of the invention which utilizes the lower piston 64, but in this instance, this piston is connected directly to the upper piston assembly including the interlocked pistons 32 and 37 by means of a connecting rod 151 which acts as an extension of the post 38. This embodiment also mounts the absorber valve 61 in the wall 103 like the embodiment of FIG. 5. With this construction, since the pistons 32, 37 and 64 are all, connected to each other assembly is facilitated.

Thus, from the foregoing description, it should be readily apparent that the described construction presents a significant improvement over the prior construction in that both the conventional shock-absorbing function of the suspension system and the vehicle control functions can be adjusted independently of the physical construction of the shock absorber so as to provide the desired degree of damping for each type of control. Of course, the foregoing description is that of preferred embodiments of the invention and various changes and modifications may be made without departing from the spirit and scope of the invention, as defined by the appended claims.

What is claimed is:

1. A suspension system for a vehicle having at least two wheels, each supported for suspension movement by a vehicle body, a first damping element having a pair of relatively moveable members defining a first fluid chamber and interposed between one of said wheels and said vehicle body for varying the volume of said first fluid chamber upon suspension movement of said one wheel, first damping means for damping the flow of fluid from said first fluid chamber, a second damping element having a pair of relatively moveable members defining a second fluid chamber and interposed between another of said wheels and said vehicle body for varying the volume of said second fluid chamber upon suspension movement of said other wheel, second damping means for damping the flow of fluid from said second fluid chamber, a conduit interconnecting said first and said second fluid chambers, and a control in said conduit for precluding fluid flow through said conduit in response to a first suspension condition and for providing a damped flow through said conduit in response to a second suspension condition, at least a portion of the fluid displaced from said first and second fluid chambers being displaced to respective first and second control chambers of said control, each of said first and second control chambers having a respective control piston, said pistons of said first and second control chambers being interconnected to each other for simultaneous movement for maintaining the same fluid displacement for each of said first and second control chambers upon the displacement of fluid from the first and second fluid chambers of the first and second damping elements, the movement of said control pistons being resisted by a second fluid control comprised of a third control chamber arrangement pressurized by simultaneous movement of said control pistons, a closed accumulator chamber and a third fluid control for controlling the flow between said third control chamber arrangement and said closed accumulator chamber.

2. A suspension system as set forth in claim 1, wherein the control is further effective to provide a variable damping effect that acts in addition to the damping of the first and second damping means under the first suspension condition.

3. A suspension system as set forth in claim 1, wherein the control provides a damped flow through the conduit in response to the second suspension condition to provide a damping effect that acts in addition to the damping of said first and second damping means under said first suspension condition.

4. A suspension system as set forth in claim 1, wherein the control pistons move in the same direction.

5. A suspension system as set forth in claim 1, further including means for maintaining a predetermined pressure in the closed accumulator chamber.

6. A suspension system as set forth in claim 5, wherein the means for maintaining a predetermined pressure in the closed accumulator chamber comprises a spring.

7. A suspension system as set forth in claim 5, wherein the means for maintaining a predetermined pressure in the closed accumulator chamber comprises a chamber charged with a gas under pressure.

8. A suspension system as set forth in claim 1, wherein the third fluid control further includes a pressure responsive valve arrangement.

9. A suspension system as set forth in claim 8, wherein the pressure responsive valve arrangement controls the flow in each direction between the third control chamber arrangement and the closed accumulator chamber.

10. A suspension system as set forth in claim 1, wherein the third fluid control further includes a flow controlling orifice.

11. A suspension system as set forth in claim 10, wherein the flow controlling orifice is adjustable.

12. A suspension system as set forth in claim 1, wherein the relatively moveable members of each damping element define a pair of additional fluid chambers comprised of a third fluid chamber formed by the first damping element and a fourth fluid chamber defined by the second damping element and wherein the fluid flow from the first and second fluid chambers of each of the damping elements flows at least in part to the other fluid chamber of the respective damping element through a respective fluid damping arrangement.

13. A suspension system as set forth in claim 12, further including means for maintaining a predetermined pressure in the closed accumulator chamber.

14. A suspension system as set forth in claim 13, wherein the means for maintaining a predetermined pressure in the closed accumulator chamber comprises a spring.

15. A suspension system as set forth in claim 13, wherein the means for maintaining a predetermined pressure in the closed accumulator chamber comprises a chamber charged with a gas under pressure.

16. A suspension system as set forth in claim 12, wherein the third fluid control comprises a pressure responsive valve arrangement.

17. A suspension system as set forth in claim 16, wherein the pressure responsive valve arrangement controls the flow in each direction between the third control chamber arrangement and the closed accumulator chamber.

18. A suspension system as set forth in claim 12, wherein the third fluid control further includes a flow controlling orifice.

19. A suspension system as set forth in claim 18, wherein the flow controlling orifice is adjustable.

20. A suspension system as set forth in claim 1, wherein the first and second control chambers are formed by a single outer housing having a first smaller diameter cylindrical bore portion receiving the first control piston and a second larger diameter portion receiving the second control piston with said control pistons being integral so that both chambers are formed in part by the respective cylinder bores.

21. A suspension system as set forth in claim 20, wherein the third control chamber is formed in the same single outer housing as the first and second control chambers.

22. A suspension system as set forth in claim 21, wherein the accumulator chamber is formed in a separate outer housing from the first, second and third control chambers and the third fluid control is located in said separate outer housing.

23. A suspension system as set forth in claim 21, wherein the accumulator chamber is formed in the same outer housing as the first, second and third control chambers and the third fluid control is located in said outer housing.

24. A suspension system as set forth in claim 1, wherein the first suspension condition is a condition wherein the same amount of fluid is displaced from both of the fluid chambers at substantially the same time.

25. A suspension system as set forth in claim 24, wherein the one wheel and the other wheel are disposed in substantially the same longitudinal position along the length of the vehicle body.

26. A suspension system as set forth in claim 1, where at least one of the conditions is a condition wherein there is an unequal load on the damping elements at the same time.

27. A suspension system as set forth in claim 26, wherein the one wheel and the other wheel are disposed in substantially the same longitudinal position along the length of the vehicle body.

28. A suspension system as set forth in claim 1, wherein one of the suspension conditions is a condition wherein the same amount of fluid is displaced from both of the fluid chambers at substantially the same time.

29. A suspension system as set forth in claim 28, where the other of the suspension conditions is a condition wherein there is an unequal load on the damping elements at the same time.

\* \* \* \* \*